United States Patent [19]

Ghilardi et al.

[11] 4,420,025

[45] Dec. 13, 1983

[54] ANNULAR REINFORCING STRUCTURE OF RADIAL TIRES

[75] Inventors: Giuliano Ghilardi, Sesto San Giovanni; Luigi Maiocchi, Vernate fraz. Moncucco, both of Italy

[73] Assignee: Industrie Pirelli S.p.A., Milan, Italy

[21] Appl. No.: 192,921

[22] Filed: Oct. 1, 1980

[30] Foreign Application Priority Data

Oct. 24, 1979 [IT] Italy .............................. 26736 A/79

[51] Int. Cl.³ .............................................. B60C 9/20
[52] U.S. Cl. ......................... 152/361 DM; 152/361 R
[58] Field of Search ...... 152/361 R, 361 DM, 361 FP

[56] References Cited

U.S. PATENT DOCUMENTS 4,146,415 3/1979 Caretta et al. ............. 152/361 DM
4,169,495 10/1979 Maiocchi ...................... 152/361 R

FOREIGN PATENT DOCUMENTS 2254449 11/1975 France .

Primary Examiner—Edward C. Kimlin
Assistant Examiner—Lois E. Boland
Attorney, Agent, or Firm—Stevens, Davis, Miller & Mosher

[57] ABSTRACT

An annular reinforcing structure for vehicle tires of a radial carcass has at least two radially superimposed layers of metal cords having an elongation at break between 2.6% and 3.2%. Two reinforcing rings are disposed in a radially external position at the extremities of the layers of metal cords with the axially outer edges coinciding with each other. The rings have a width between 7% and 40% of the width of the radially inner layers, and comprise metal cords having an elongation at break between 4% and 8%. The metal cords are oriented according to the longitudinal direction of the tire and are disposed in at least two radially superimposed strips.

6 Claims, 11 Drawing Figures

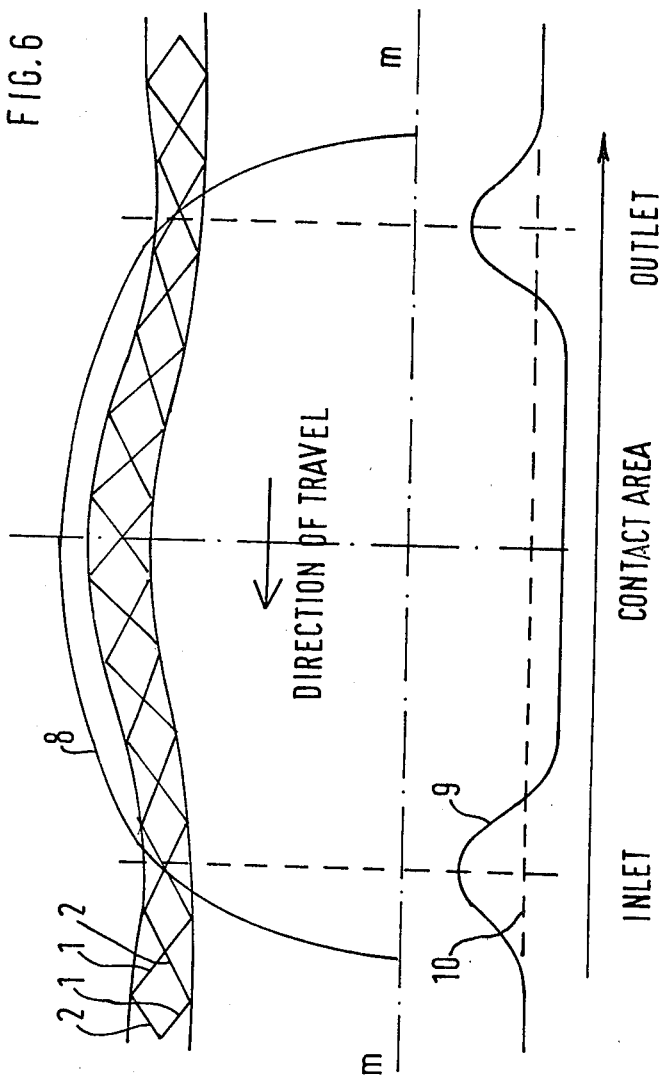

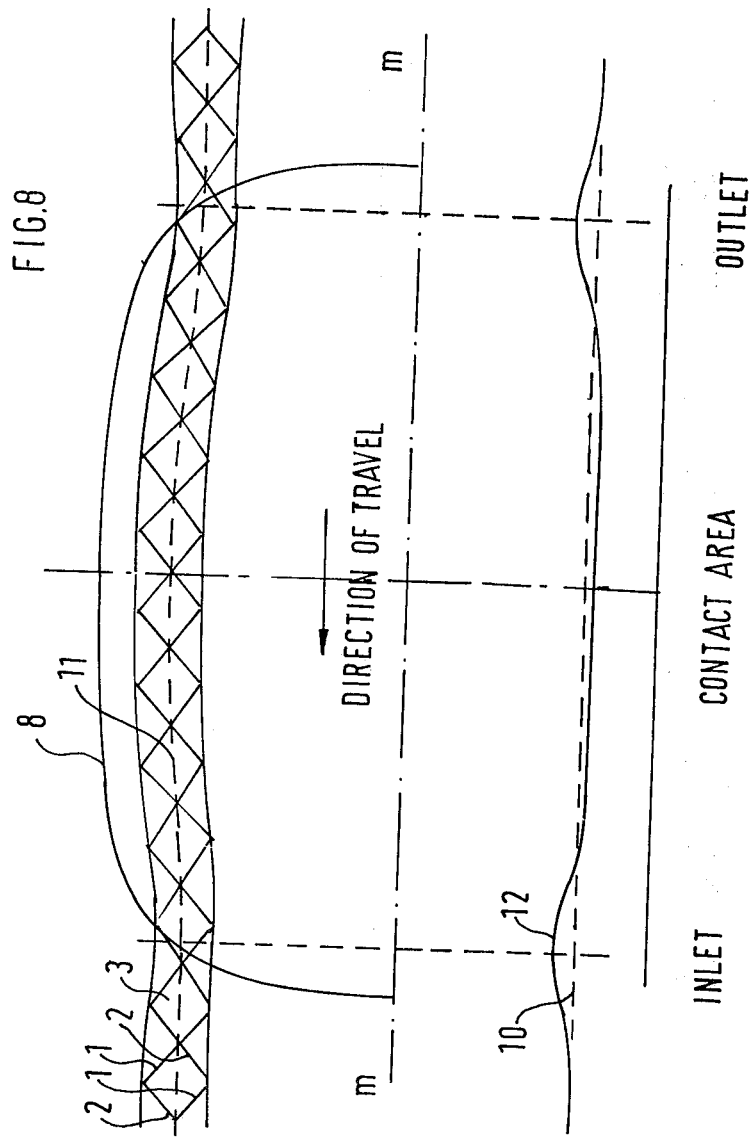

ANNULAR REINFORCING STRUCTURE OF RADIAL TIRES

The present invention relates to radial type pneumatic tires for motor vehicle wheels provided with a carcass whose cords lie in substantially radial planes, and with an annular reinforcing structure in the crown, between the tread and carcass, which shall often be simply called "belt" in this description.

In every tire, the main characteristics required are increased mileage (kilometers covered), a resistance to fatigue and good performance at high speeds, good driving behavior, and a low resistance to rolling over the road surface, which latter result in low fuel consumption. The need for such characteristics increases daily due to the appearance on the market of motor vehicles that are more powerful and faster, and with the present availability of correct road conditions for travelling at high speeds on open highways.

The structure of radial tires which has been adopted heretofore has practically reached its limits in meeting the requirements, both, with regard to fatigue resistance and to velocity, as well as to increased mileage, especially at high cruising speeds.

Moreover, these types of situations require greater driving safety because of the poorer stability of commercial vehicles travelling at high speeds and with the barycenter of the load being relatively high above the ground, a usual situation with this type of vehicle.

Lowering the barycenter by reducing the diameter of the casing but maintaining, however, an equal load capacity i.e. a reduction in the section height 'H' with respect to the tire width 'C', is insufficient for guaranteeing safety, since, although improving the driving behavior and absorption of horsepower, this tends to weaken the structural resistance of the carcass itself to fatigue and to velocity, not to mention the kilometers to be covered and the lack of uniformity in wearing between the tread shoulders which are more abradable, and the tread center.

In spite of the many attempts in various directions, these drawbacks have not yet been eliminated through the use of the usual well-known belt structures. It has now been discovered that it is possible to correct these defects, while moreover, increasing the qualitative characteristics of radial tires of the type contemplated by this invention.

An object of the present invention is therefore to provide a new type of belt for vehicle tires having a radial carcass which substantially eliminates the aforesaid disadvantages and effectively resolves the heretofore problems. Another object of the invention is to provide an improved belt for vehicle tires having a radial carcass. Still another object of the invention is to provide an improved pneumatic tire for motor vehicles having a novel and improved annular reinforcing structure (belt) between the tread and radial type carcass in the crown of the tire. Other objects will become apparent from the following description with reference to the accompanying drawing wherein FIG. 1 illustrates diagrammatically in a fragmentary cross-section one embodiment of the tire and annular reinforcing structure provided by the invention;

FIG. 6 is a diagram illustrating deformations in prior art belts in some contact areas;

Figure 10:
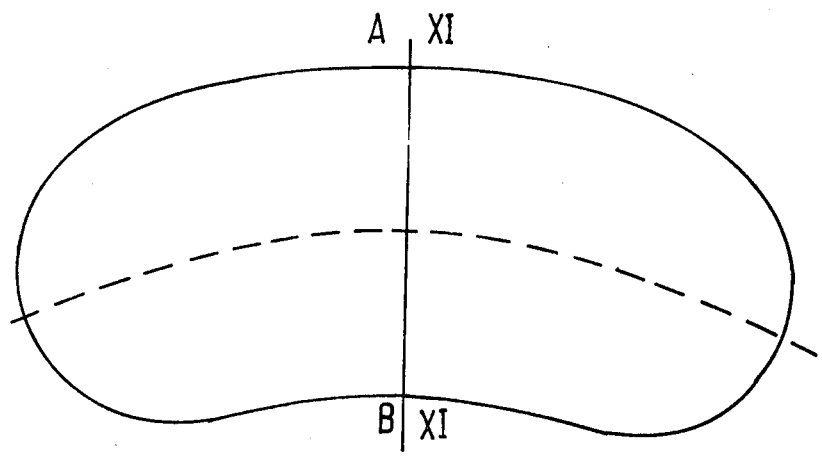
Figure 11:
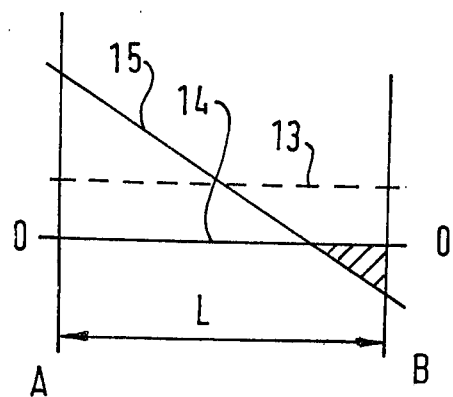

FIG. 7 placed in close correlation with FIG. 6 illustrates diagrammatically the deformations in prior art belts of FIG. 6 in the longitudinal direction;

FIG. 8 is a diagrammatic illustration similar to that of FIG. 6 of deformations of the annular reinforcing structure provided by the invention;

FIG. 9 placed in close correlation with FIG. 8 illustrates diagrammatically the deformations of the tire of the invention in the longitudinal direction;

FIG. 10 illustrates the contact areas of a motor vehicle pneumatic tire during cornering; and FIG. 11 is a diagram illustrating the development of tension forces in a belt structure, in cross-section, during running both along a straight path and in cornering.

The foregoing objects and others are accomplished in accordance with this invention, generally speaking, by providing a pneumatic tire for the wheels of a vehicle having a radial type carcass, a tread band disposed over the crown portion of the tire and an annular reinforcing structure or "belt" disposed between the carcass and the tread band, the reinforcing structure having at least two radially superimposed layers of a metallic fabric which are substantially as wide as the tread and are provided with cords having an elongation at the breaking point of 2.6% to 3.2% which cords are disposed substantially parallel to each other in each layer and are crossed with the cords of the adjacent layer. The cords in each layer are symmetrically inclined with respect to the longitudinal direction of the tire at an angle of from 10° to 30°. The annular reinforcing structure is provided on the lateral portions and in a radially external position with respect to the two radially superimposed layers with a reinforcing ring having a high elongation "lang-lay" type metallic cords, having an elongation at the breaking point of 4% to 8% and disposed substantially parallel to each other and to the equatorial plane of the tire, said reinforcing ring being constituted by at least two radially superimposed strips of said cords, the outer edge of each ring coinciding substantially with the edge of the said radially inner layers, the axial width of said ring being from 7% to 40% of the axial width of the annular reinforcing structure.

In some advantageous embodiments of the belt, the two rings are formed by a single helicoidal winding of a wire in two superimposed strips of adjacent coils or, alternately, by two distinct windings, one for each ring, always with a helicoidal winding of a wire in two superimposed strips of adjacent coils or with each ring being constituted by two radially superimposed turns of a fabric-tape, with the initial and final extremities being coincident, in overlapping correspondence.

The annular reinforcing structure can be further improved with one or more layers of metallic fabric, inserted in the zone between the two rings in a radially external position to the layers with cords at 10° to 30°, reinforced with both the low elongation type, as well as the High Elongation type cords, oriented at an angle between 10° and 40° with the longitudinal direction of the tire, and in cooperation or as an alternative to said additional layers, with one or more layers of metallic fabric disposed in a radially inner position to the annular reinforcing structure, provided with cords either of one type or of the other elongation, oriented according to any suitable angle, always with respect to the longitudinal direction of the tire.

Figure 1:
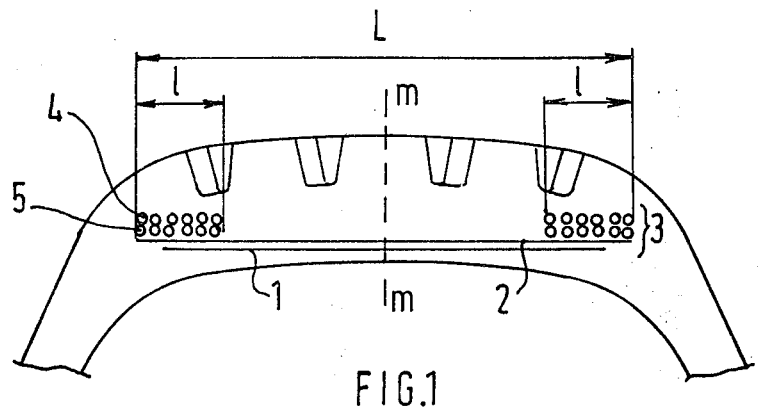

Referring now to the drawing, the embodiment shown in FIG. 1 prepared for a tire having the size 315/70 R22.5 of the series 70 (H/C=0.7), comprises therefore two layers 1 and 2, of metallic fabric, having a width 'L' substantially equal to that of the tread, the difference in width between the two layers being on the order of the usual graduation between layers that are superimposed i.e., equal to about 5 mm, and may be between 5 and 10 mm.

The cords of these two layers are the conventional metallic cords having an elongation at the breaking point of between 2.6% and 3.2%. The cords are disposed in each layer, parallel to each other, but crossed with those of the adjacent layer.

Moreover, the cords are symmetrically inclined at both of their sides, with respect to the equatorial plane of the tire at an angle of 20° (however, they may be at an angle of between 10° and 30°).

The lateral portions of the radially outermost layer 2, are surmounted by a reinforcing ring 3, constituted by two radially superimposed strips 4 and 5, of high elongation lang-lay cords, with an elongation at the breaking point between 4% and 8%. These cords are usually defined as 'High Elongation' cords and are identified by the international abbreviation 'HE' (High Elongation).

The external edge of each ring, with respect to the equatorial plane of the tire, coincides substantially with the edge of the bundle of layers that is radially innermost, apart from the difference due to the necessity of an offsetting between the superimposed textile elements in the range of one-half a centimeter, whereas the width 'l' of each ring is equal to 24%(however, it may be between 7% and 40%) of the maximum belt width.

Figure 2:
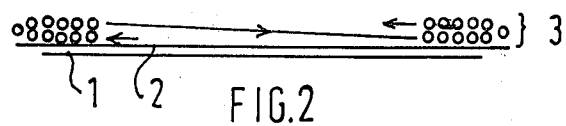
FIGS. 2, 3 and 4 are enlarged diagrammatic cross-sections of the annular reinforcing structure of the tire of FIG. 1.

The HE metallic cords can be disposed on the layer 2 by any suitable method. A first possibility (FIG. 2) is offered by a single wire, helicoidally wound in two overlapping strips of adjacent coils, with 'skipping' over the intermediate part of the annular reinforcing structure. In other words, a single HE cord is wound over the bundle of layers 1 and 2, with a helicoidal movement, according to the adjacent spires, starting from the axial inner edge of one ring, proceeding up to the axial outer edge, and thence, in the inverse sense, in a radially outer position.

Once the cord feeder has again reached the axially inner edge, it 'skips' over the central part of the layer 2, and continues to wind the cord, starting from the axially inner edge of the ring opposite until it reaches its axially outer edge, and then, once again in the inverse sense, in a radially outer position, until returning to the axially inner edge.

In this case, the two rings that have been prepared one after the other, are connected to one another by one turn of cord on the central part of the layer 2 that maintains the continuity of the wire between one ring and the other.

Figure 3:
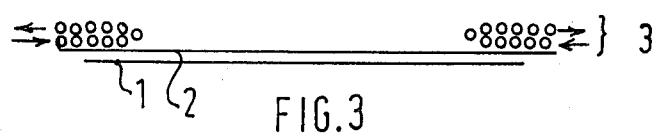

As an alternative, according to the embodiment illustrated in FIG. 3, each of the two strips is formed simultaneously with the other, by helicoidally winding a HE cord in two radially superimposed strips of adjacent coils, starting from the axially outer edge, proceeding to the axially inner edge, and thence, in the inverse sense, in a radially outer position to the axially outer edge.

Naturally, the opposite movement is also possible, i.e., starting from the axially inner edge rather than from the outer edge. In other words, the zone of the inverted movement of the cord feeder can be either in the axially inner position, or in the axially outer position with respect to the ring.

Figure 4:
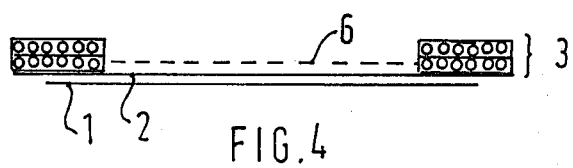

According to another embodiment (FIG. 4), the two rings are formed by winding two tapes, or preferably one twice-turned tape of metallic fabric, provided with the HE cords oriented longitudinally and parallel to each other, and by assuring that the extremities of the tape or of each tape, are coincident superimposed one over the other, as overlapped.

The structure of the belt in FIG. 1, in the above-said embodiment, comprises moreover, a third layer six (FIG. 4) of cords oriented at 35° with respect to the longitudinal direction of the tire, and crossed with the cords of the layer 2, disposed in a radially external position with respect to the said layer 2, between the rings 3, with having a gravel-guard function.

In any case, as already stated, layer 6 can be substituted with one or more layers of metallic fabric, provided with either normal type cords, or with HE cords oriented at angles between 10° and 40° according to the type of function required.

Figure 5:
FIG. 5 illustrates diagrammatically a second embodiment of an annular reinforcing structure provided by the invention.

Moreover, the structure of this particular embodiment comprises a further fourth layer 7 (FIG. 5) of metallic fabric, in a radially inner position to the annular reinforcing structure, and in contact with the carcass ply, provided with cords of the normal type (elongation at breaking point, equal to 3%) crossed with the cords of the adjacent layer 1 and oriented with respect to an angle of 60°.

Even in this case, this layer can be substituted by one or several layers of metallic fabric, with any type of cords oriented according to any desired angle with respect to the longitudinal direction of the tire.

The belt structure, just described, has demonstrated that it has efficaciously resolved the problem stated at the beginning of this description, bringing about a clear qualitative improvement in the characteristics of the tire.

What is more, for better understanding the problem which lies at the base of the invention, and also the reason why the usual 'known' belt structures are incapable of solving the problem, an attempt will be made to explain in more detail (to which however, there is no intention to be bound in any way) of the phenomenon of the deformation undergone by the belt structure during its passage under the contact area of the tire.

In doing so, reference is made to a diagram which is believed to be sufficiently approximate to the reality of the phenomenon and to FIGS. 6 to 11.

To begin with, a conventional tire illustrating the state of the art should be considered in its movement along a rectilineal trajectory as indicated in FIG. 6, from the arrow of the direction of movement.

FIG. 6 indicates the outline of the contact area (8) limited to one-half of the tire, cut according to the equatorial plane m-m, and the tracks of the corresponding lateral portion of the annular reinforcing structure in which are shown pairs of cords of the layer 1, and pairs of cords of the layer 2 identified by the same number of layers.

Clearly, the crossing of the pairs of cords gives rise to a plurality of rhombi.

Hence, FIG. 6 naturally represents just the qualitative viewpoint and, by exaggerating the actual dimension of the phenomenon, the lay-out of the deformations in the belt structure constituted by only the layers 1 and 2.

Whenever a portion of the belt comes under the contact area, the variation of the rolling-ray and the flattening of the curvilinear profile of the tread against the ground, provoke in the belt layers, first a longitudinal smoothing with consequent transverse contractions, and successively, deformation in an opposite sense, i.e. a small transverse dilation at the center which increases as it moves towards the edges.

In other words, particularly the end portions of the cords which belong to layers 1 and 2, shift according to the combination of two movements, the first scissors-like reciprocally between the cords, the other movement being a parallel-translation of the cords.

At the exiting from the contact area, a new change in the direction of the deformation occurs, which is similar to those deformations present at the entry into the contact area.

FIG. 7 which is placed in direct correlation with the contact area of FIG. 6, illustrates the diagram of the longitudinal deformation (line 9) undergone by the usual belt, which reaches its maximum extension, with regard to the condition of a simply inflated and stationary tire (line 10), at the entry and exit from the contact area, and its maximum reduction in the central zone of the contact area.

Slipping of the tread-band on the ground, as a consequence of the belt deformations, contributes considerably to the formation of irregularities and uneven wear and tear as already stated, which consequently seriously reduces the mileage covered by the tire.

Coming now to the corresponding FIGS. 8 and 9 respectively, these graphically illustrate the qualitative layout of the same type of deformations, as already illustrated in FIGS. 6 and 7, but for the belt provided by the invention, i.e., provided with the rings 3 of cords at 0°.

In FIG. 8, line 11 indicates the position according to which there is disposed an HE cord of the reinforcing ring 3. This cord being in particular metallic, reacts to the forces applied with deformations having a minimal entity, for which, having disposed on the layers 1 and 2 a double winding of the HE cords oriented longitudinally according to the invention, all the movements of the cords of the layers 1 and 2 being strongly restrained, and in practice of the entity allowed in the order of magnitude of the elongation of the HE cord for the tensional value borne by it (line 12 of FIG. 9). In other words, the longitudinal cord tends to block the junction points of the rhombi, i.e., the relative movements of the cords of the breaker layers and consequently, also the belt deformations on the supporting plane upon the ground, with relative slipping of the tread band.

Obviously, the result of all this is a clear improvement in the abrasion resistance of the tread.

As a consequence of the limitation of movement of the cord in layers, tension developed in the rubber compound of the layers is substantially reduced and discharged onto the cords at 0°, which are more resistant because they are steel, and hence, from this an improved resistance to fatigue under all running condition results.

We shall now consider the tire during 'drifting', i.e., when maneuvering a curvilinear trajectory or in other words a curve in the road.

The 'contact area' changes its form to 'bean-shaped' (FIG. 10), for which reason the portion of the annular reinforcing structure axially outside of the curve undergoes a further increase in tension, with respect to the tension encountered during the rectilineal trajectory; while the portion inside the curve undergoes an opposite action, with a decrease of the tension forces, and is sometimes compressed. In other words, on the strips at 0° in the belt of the invention, there are discharged additional forces.

This situation is represented in FIG. 11, which illustrates the qualitative diagram of the forces in the belt structure, in a transverse cross-section in correspondence of the plane of the section XI—XI in FIG. 10, in a tire running under both drifting conditions, as well as during a straight stretch. In FIG. 11, the tract A-B represents the belt width, with A being the outer side of the curve, and B the inner side of the curve.

The line 13, represents schematically the tension force in the tire, throughout the entire belt during a straight drive; the line 14 indicates the reference line for the values of the force that is represented with the line 13; the line 15 shows the diagram of the forces in the belt structure under the 'drift' condition when driving; the zone denoted by the broken line indicates the belt portion under compression.

It is understandable therefore, that whereas damage to the belt, owing to greater tension stresses, could be perhaps nullified with a single layer of cords at 0° opportunely strengthened, those due to the compressional stresses, are not eliminated in fact by such a layer, owing to the low resistance to the "bending and compression stresses" resulting from compression on the cords at 0°.

Instead, couple of superimposed strips at 0°, even having an equal resistance to tension stresses, with respect to just one strip, presents a substantially greater resistance to bending and compression stresses, due to the increased thickness, so much so, that it has been verified that even in the presence of stresses in a curve, at the limit of the road-gripping of the tire, and after the tire tread has completely worn out during the above conditions, in the couple of superimposed strips (or tapes) of cords at 0° of the invention, the HE cords do not rupture.

It has also been noted that all the characteristics of driving along a curve and at an overtaking speed are clearly improved thanks to the greater flexional rigidity in the longitudinal sense and to the greater resistance to any folding of the belt's lateral portions, because of the increased thickness of the said couple of strips, with respect to the single strip also of cords at 0°.

Also, the structure of the belt of the invention, makes it possible to distribute the tension forces acting in a tire inflated at operating pressure and in an idle state at about $\frac{2}{3}$ in the bearing layers 1 and 2, and $\frac{1}{3}$ in the rings of cords at 0°, with the consequent participation of the entire structure in resisting the stresses during operation.

Clearly, this result would not be obtainable with cords disposed longitudinally of the conventional type having a low elongation (2.6%-3.2%) at breaking point. Such cords in fact, because of their substantial inextensibility and their particular disposition at 0°, would completely absorb the tension forces acting upon the structure, thus eliminating stresses on the underlying layers, and consequently cause a serious upset in the force distributing geometry.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A pneumatic tire for vehicle wheels, comprising a radial tire carcass having a crown zone, a tread-band disposed over the carcass in the crown zone, and an annular reinforcing structure disposed between the carcass and the tread-band, said annular reinforcing structure comprising at least two radially superimposed layers of metallic fabric which are substantially as wide as the tread and comprising cords having an elongation at the breaking point of between 2.6% and 3.2%, said cords being parallel to each other in each layer and crossed with those cords of the adjacent layer, and symmetrically inclined with respect to the longitudinal direction of the tire at an angle of between 10° and 30°, and, in a radially external position with respect to said layers, a plurality of superimposed strips of adjacent coils of lang-lay type metallic cords having an elongation at the breaking point between 4% and 8%, disposed parallel to one another and with the equatorial plane of the tire, characterized by the fact that said plurality of superimposed strips comprise reinforcing rings only on lateral portions of said annular reinforcing structure, said reinforcing rings being constituted by at least two radially superimposed strips of said metallic cords, the outer edge of each ring being disposed substantially over the edges of said radially inner layers, the axial width of said rings being between 7% and 40% of the axial width of said annular reinforcing structure.

2. The tire of claim 1, characterized by the fact that both said rings are formed by a single helically wound wire, wound in two superimposed strips of adjacent coils.

3. The tire of claim 1, characterized by the fact that each of said rings is formed by a distinct helically wound wire, wound in two superimposed strips of adjacent coils.

4. The tire of claim 1, characterized by the fact that each of said rings is formed by two radially superimposed turns of a fabric tape having its initial and final extremities reciprocally coincident.

5. The tire of claim 1, 2, 3 or 4 comprising in a radially external position to said layers, on the central portion between said rings, at least one additional layer of metallic fabric comprising cords which are oriented at an angle of 10° to 40°.

6. The tire of claim 1, 2, 3 or 4 comprising in a radially inner position of said layers at least one additional layer of metallic fabric.

* * * * *